(12) United States Patent
Akers (10) Patent No.: US 11,971,193 B1
(45) Date of Patent: Apr. 30, 2024

(54) HUMIDITY AND/OR HYDROGEN CONTROL PRODUCTS, AND PRODUCTION

(71) Applicant: JEA Holdings, LLC, Hollister, MO (US)

(72) Inventor: Jeffrey W. Akers, Walnut Shade, MO (US)

(73) Assignee: JEA Holdings, Inc., Hollister, MO (US)

( * ) Notice: Subject to any disclaimer, the term of this patent is extended or adjusted under 35 U.S.C. 154(b) by 424 days.

(21) Appl. No.: 17/472,630

(22) Filed: Sep. 11, 2021

Related U.S. Application Data (63) Continuation-in-part of application No. 16/688,184, filed on Nov. 19, 2019, now Pat. No. 11,137,153, which is a continuation-in-part of application No. 14/543,157, filed on Nov. 17, 2014, now abandoned.

(60) Provisional application No. 61/993,125, filed on May 14, 2014, provisional application No. 61/904,560, filed on Nov. 15, 2013.

(51) Int. Cl.
*F24F 3/14* (2006.01)
*B01D 53/26* (2006.01)

(52) U.S. Cl.
CPC .......... *F24F 3/1411* (2013.01); *B01D 53/261* (2013.01); *B01D 2257/80* (2013.01); *F24F 2003/144* (2013.01)

(58) Field of Classification Search
CPC ............. F24F 3/1417; F24F 2003/1458; F24F 3/1411; F24F 2003/144; B01D 53/261; B01D 2257/80

USPC ...................... 236/44 A, 44 E; 95/10; 96/118
See application file for complete search history.

(56) References Cited

U.S. PATENT DOCUMENTS

| | | | | |
|---|---|---|---|---|
| 3,942,511 A * | 3/1976 | Black | ...................... | F24V 30/00 205/639 |
| 3,993,577 A * | 11/1976 | Black | ...................... | F24V 30/00 423/657 |
| 4,017,414 A * | 4/1977 | Black | ...................... | C01B 3/061 423/657 |
| 4,264,362 A * | 4/1981 | Sergev | .................. | H01M 8/065 428/570 |
| 4,373,391 A * | 2/1983 | Johnson | ............... | G01N 27/121 252/187.1 |
| 4,462,930 A * | 7/1984 | Suzuki | .................. | G01N 27/121 29/610.1 |
| 5,096,549 A * | 3/1992 | Yamauchi | .............. | B01D 53/26 204/266 |
| 6,128,193 A * | 10/2000 | Moss | ...................... | G05D 22/00 379/330 |
| 6,214,255 B1 * | 4/2001 | Hekal | ................ | B01J 20/28042 34/95 |
| 6,921,473 B2 * | 7/2005 | Ward-Close | ............ | C22C 47/14 205/372 |

(Continued)

*Primary Examiner* — Joshua E Rodden
(74) *Attorney, Agent, or Firm* — Linda L. Lewis (57) ABSTRACT

Electro-catalytic hydrogenation is achieved by reacting a reactant with said micro-galvanic couples into a metallic compound and hydrogen, whereby at least some to all of hydrogen hydrogenates the reactant into a hydrogenated product, wherein the particulate micro-galvanic couple includes particles of at least one less active conductor and particles of at least one more active metal conductively and fixedly bonded together, and wherein the particles of the at least one less active conductor and the particles of the at least one more active metal retain their natural properties when conductively and fixedly bonded together.

20 Claims, 8 Drawing Sheets

(56) References Cited

U.S. PATENT DOCUMENTS

| | | | |
|---|---|---|---|
| 6,936,354 B2* | 8/2005 | Ferrario | H10K 50/846 |
| | | | 428/917 |
| 6,988,717 B2* | 1/2006 | Han | F22B 1/284 |
| | | | 261/130 |
| 7,201,959 B2* | 4/2007 | Judek | C08K 3/34 |
| | | | 428/323 |
| 7,501,011 B2* | 3/2009 | Powers | B01J 20/103 |
| | | | 252/194 |
| 7,665,601 B2* | 2/2010 | Portier | B65D 79/02 |
| | | | 206/459.1 |
| 7,691,288 B2* | 4/2010 | Wang | B01J 20/28026 |
| | | | 501/15 |
| 8,048,201 B2* | 11/2011 | Dukes | B01J 20/0292 |
| | | | 95/138 |
| 8,211,209 B2* | 7/2012 | Neff | B65D 85/12 |
| | | | 55/516 |
| 2013/0167840 A1* | 7/2013 | Monzyk | C01B 32/60 |
| | | | 428/137 |
| 2013/0228469 A1* | 9/2013 | Ito | B22F 9/20 |
| | | | 205/372 |

* cited by examiner

TABLE 1
Equilibrium Relative Humidity Values For Selected Saturated Salts at 25°C (~77°F)

| Saturated Salt Solution | Equilibrium Relative Humidity |
|---|---|
| Cesium Fluoride | 3.39 ± 0.94% |
| Lithium Bromide | 6.37 ± 0.52% |
| Zinc Bromide | 7.75 ± 0.39% |
| Potassium Hydroxide | 8.23 ± 0.72% |
| Sodium Hydroxide | 8.24 ± 2.1% |
| Lithium Chloride | 11.30 ± 0.27% |
| Calcium Bromide | 16.50 ± 0.20% |
| Lithium Iodide | 17.56 ± 0.13% |
| Potassium Acetate | 22.51 ± 0.32% |
| Potassium Fluoride | 30.85 ± 1.3% |
| Magnesium Chloride | 32.78 ± 0.16% |
| Sodium Iodide | 38.17 ± 0.50% |
| Potassium Carbonate | 43.16 ± 0.39% |
| Magnesium Nitrate | 52.89 ± 0.22% |
| Sodium Bromide | 57.57 ± 0.40% |
| Cobalt Chloride | 64.92 ± 3.5% |
| Potassium Iodide | 68.86 ± 0.24% |
| Strontium Chloride | 70.85 ± 0.04% |
| Sodium Nitrate | 74.25 ± 0.32% |
| Sodium Chloride | 75.29 ± 0.12% |
| Ammonium Chloride | 78.57 ± 0.40% |
| Potassium Bromide | 80.89 ± 0.21% |
| Ammonium Sulfate | 80.99 ± 0.28% |
| Potassium Chloride | 84.34 ± 0.26% |
| Sodium Nitrate | 85.06 ± 0.38% |
| Potassium Nitrate | 93.58 ± 0.55% |
| Potassium Sulfate | 97.30 ± 0.45% |
| Potassium Chromate | 97.88 ± 0.49% |

HUMIDITY AND/OR HYDROGEN CONTROL PRODUCTS, AND PRODUCTION

CROSS-REFERENCE TO APPLICATION(S)

This application claims the benefit of U.S. Provisional Application No. 61/904,560, filed Nov. 15, 2013, U.S. Provisional Application No. 61/993,125, filed May 14, 2014, U.S. Utility application Ser. No. 14/543,157 filed Nov. 17, 2014, and CIP Utility patent application Ser. No. 16/688,184 filed Nov. 19, 2019. The foregoing patent disclosures are incorporated herein by this reference thereto.

BACKGROUND OF THE INVENTION

This invention relates not only to moisture and/or humidity control products, but also relates to the production and use of such products.

Humidity is the amount of water vapor (i.e., water in a gaseous state) in an environment. One typical environment is the ambient atmosphere. However, it is an aspect of the invention to control the humidity (or amount of water vapor) within a much more limited environment, such as a workspace, an enclosure or a container and the like. This more limited environment might be sealed. But more typically, the limited environment will have leaks or ports to the ambient atmosphere, or otherwise have independent sources or sinks of water vapor within the environment.

Therefore, it is an aspect of the invention to maintain a relatively constant humidity (i.e., relatively constant water vapor percentage at a temperature) in an environment despite gains or losses of water vapor to or from the environment.

In other words, it is an object of the invention to provide humidity control measures that can make adjustments and cancel the gains or make-up for the losses of water vapor within the environment in order to maintain the water vapor percentage at a relatively constant level.

Air has the ability to carry water vapor (i.e., water in the gaseous state). The terminology 'water vapor pressure' refers to a quantity that can be measured in air and corresponds to the amount of water vapor (i.e., water in the gaseous state) that air is carrying at any given moment. At any given temperature, air has a property called water vapor pressure 'saturation point.' This corresponds to the amount of water vapor that is in the air at air's maximum carrying capacity for such water vapor. 'Saturation point' values for air vary with temperature.

Relative humidity is the ratio of the actual measure of the water vapor pressure in the air at a given moment and at a given temperature, relative to the 'saturation point' value for that particular temperature. In other words, relative humidity is the ratio of an actual value of water vapor in air at any given moment relative to the known maximum limit. And as a maximum limit, the 'saturation point' value is a ceiling and not a floor.

Relative humidity is expressed as a percentage. When the actual measure of water vapor pressure in an environment corresponds to the 'saturation point,' the relative humidity is said to be '100% relative humidity.'

Air, at higher temperatures, typically has a greater carrying capacity for water vapor than at lower temperatures. Nevertheless, for each temperature, air has this so-called 'saturation point' water vapor pressure. In the atmosphere, when the relative humidity reaches 100%, then the atmosphere is correctly said to be 'saturated,' and ripe for a rain fall. With just some slight drop in the temperature, then some fraction of the water vapor in the atmosphere will condense from the vapor phase (i.e., the gaseous phase) and thereby into the liquid phase. That way, the water carrying capacity of the atmosphere adjusts to being no greater than 100% relative humidity. This condensation can be in the form of mist, fog, a film on surfaces (like dew), or heavy precipitation and so on.

The term 'moisture' refers to not only liquid water (i.e., water in the liquid phase) but also water vapor (i.e., water in the gaseous phase). Workers in some technical fields alternatively call water in the liquid phase as "condensate."

Regardless, water in the liquid phase (or condensate) includes not only puddles and pools but also wafting droplets in the environment such as mist and fog, or films on surfaces, and so on. Again, and according to context, the term 'moisture' can refer to either to condensate/water in the liquid phase, or, water vapor/water in the gaseous phase (e.g., humidity).

To control humidity in an environment, prior art ways of doing so do include precision electronic equipment known as humidity generators. Humidity generators, however, are expensive and complex. For this reason, chemical systems remain popular alternatives.

These chemical systems utilize, more or less, the properties of a hygroscopic substance or solution. Hygroscopy is the ability of a substance or solution to attract and hold water molecules from the surrounding environment.

Hygroscopic substances or solutions have typically been divided into four divisions, namely:
desiccants,
humectants,
saturated solutions, and
deliquescents.

However, there are unclear boundari.es and/or overlap among these divisions. For example, lists can be found listing lithium chloride (LiCl) as a member of all four divisions. According to one list or another, lithium chloride (LiCl) is a desiccant and a humectant, it forms a saturated solution, and it is a deliquescent.

Desiccants and humectants are utilized for opposite purposes. Desiccants are used to keep an environment dry. Humectants are used to keep things moist.

Briefly, non-deliquescing desiccants have shortcomings for relatively-precise humidity control (deliquescents will be discussed more particularly below).

Non-deliquescing desiccants are typically insoluble in water. Example non-deliquescing desiccants include silica gel (silicon dioxide), calcium silicate, uncooked rice and so on.

Silica gel wrapped in TYVEK® pouches are used quite widely for moisture control, wherein the pouches are put in packaging of a wide array of goods. Calcium silicate is an additive with the table salt (NaCl) that serves as an anti-caking agent. Rice grains are likewise added to table salt for the same purpose, albeit not by the commercial compani.es that package and wholesale our table salt. But it is common to see in eating establishments (it seems like diners in particular) that there might be a few grains of rice in every salt shaker.

Non-deliquescing desiccants attract and hold water molecules by having moisture adsorb on their surfaces. The problems for precision humidity control are twofold. Non-deliquescing desiccants really never adjust for fresh gains or losses of water vapor in the environment. For silica gel in particular, it just adsorbs and adsorbs water moisture, continually so until fully loaded, when it can adsorb no more. So in a small semi-sealed enclosure, silica gel would act to pull the relative humidity down to low humidity. In other words silica gel will dry an environment in excess of what is necessary and consume its meager capacity for moisture. In view of the foregoing, it is an object of the invention to overcome the shortcomings of non-deliquescing desiccants.

To turn to humectants, these substances not only attract and retain moisture from an environment, but can also transfer and release the moisture to another object. Excluding deliquescing humectants (again, deliquescents will be dealt with later), one example of a non-deliquescing humectant is glycerol.

Glycerol is a food and beverage additive. It is also used in medical, pharmaceutical and personal-care preparations, including without limitation cough syrups, toothpaste, mouthwashes, skin care moisturizers, hair care products and so on. But even though humectants attract and retain water molecules (and also transfer and release moisture to other things), non-deliquescing humectants do so with properties that do not allow a designer to design much control over the relative humidity in an environment. It is correspondingly another object of the invention to overcome the shortcomings of non-deliquescing humectants.

Unlike non-deliquescing desiccants and non-deliquescing humectants, saturated solutions do indeed have properties that allow precision humidity control.

The relative humidity of an environment will be affected by all solutions. It is assumed, however, that these are solutions of water-soluble solutes dissolved in a water pool within that environment. The preferred solutes are water-soluble salts. While there are other solution systems that will work, most of the interest and utilization has been with water-soluble salts.

Before explaining how solutions work, first imagine a one pint (~500 ml) jar, filled about third full with distilled water, and then tightly capped. If let rest long enough, the airspace in the upper two thirds of the jar will reach an "equilibrium relative humidity" of 100%. Water is present both in the liquid pool in the bottom third of the jar, and also present as a gas in the airspace in the upper two thirds (i.e., the "environment"). When allowed to reach equilibrium, the equilibrium relative humidity will be 100% in this environment.

Moreover, if the jar is left undisturbed, that "equilibrium relative humidity" of 100% will remain constant. But it is not because things are fixed in an immobile state. On the contrary, there is a constant exchange of moisture between the liquid pool and the airspace in the jar. Some fraction of the gaseous phase in the airspace is constantly being absorbed in (or condensed in) the liquid phase to become liquid again. An equal fraction of replacement gaseous phase is constantly being evolved out of (or vaporizing out of) the liquid phase to enter into the airspace. However, this exchange reaches an equilibrium. And therefore the "equilibrium relative humidity" remains constant. Gaseous water vapor is continually evolving out of the liquid, and, replacement liquid is continually being condensed out of the vapor in the airspace. This exchange goes back and forth in a perpetual cycle. But the net effect on "equilibrium relative humidity" in the airspace is that, it remains constant. And in this case, the value is 100%.

Now imagine that the liquid pool in the jar were not pure distilled water but instead a solution having a non-volatile water-soluble substance dissolved in the water. That substance is technically called a solute. A familiar such solute is table salt (NaCl).

It has long been recognized that, all dissolved compounds interfere with that perpetual exchange of water due to a difference in entropy in the liquid phase going to the gaseous phase, and then in return, water in the gaseous phase going back to the liquid phase. In fact, all dissolved compounds interfere with the perpetual exchange such that the relative humidity in the airspace will always be less than 100%. Solutions of some substances only produce a mild effect. Solutions of other substances produce a severe effect.

A "saturated" solution has a highly desirable property for the purposes here. Imagine further that pure table salt (NaCl) was poured into the pure distilled water in the bottom third of the jar. So much table salt was poured in that, a mound of crystals formed on the bottom of the jar, about 2.5 cm high (1 inch high). Cap tightly again. Let the jar rest for a long time.

What happens is, there will still be more or less that same mound of salt crystals on the bottom. The fact that the mound persists indicates that this solution is a "saturated" solution of pure table salt (NaCl). Which is really important because, the "equilibrium relative humidity" of hundreds if not thousands of different "saturated" solutions can simply be looked up by consulting a reference book. (Provided that, the temperature is known.)

Figure 1:
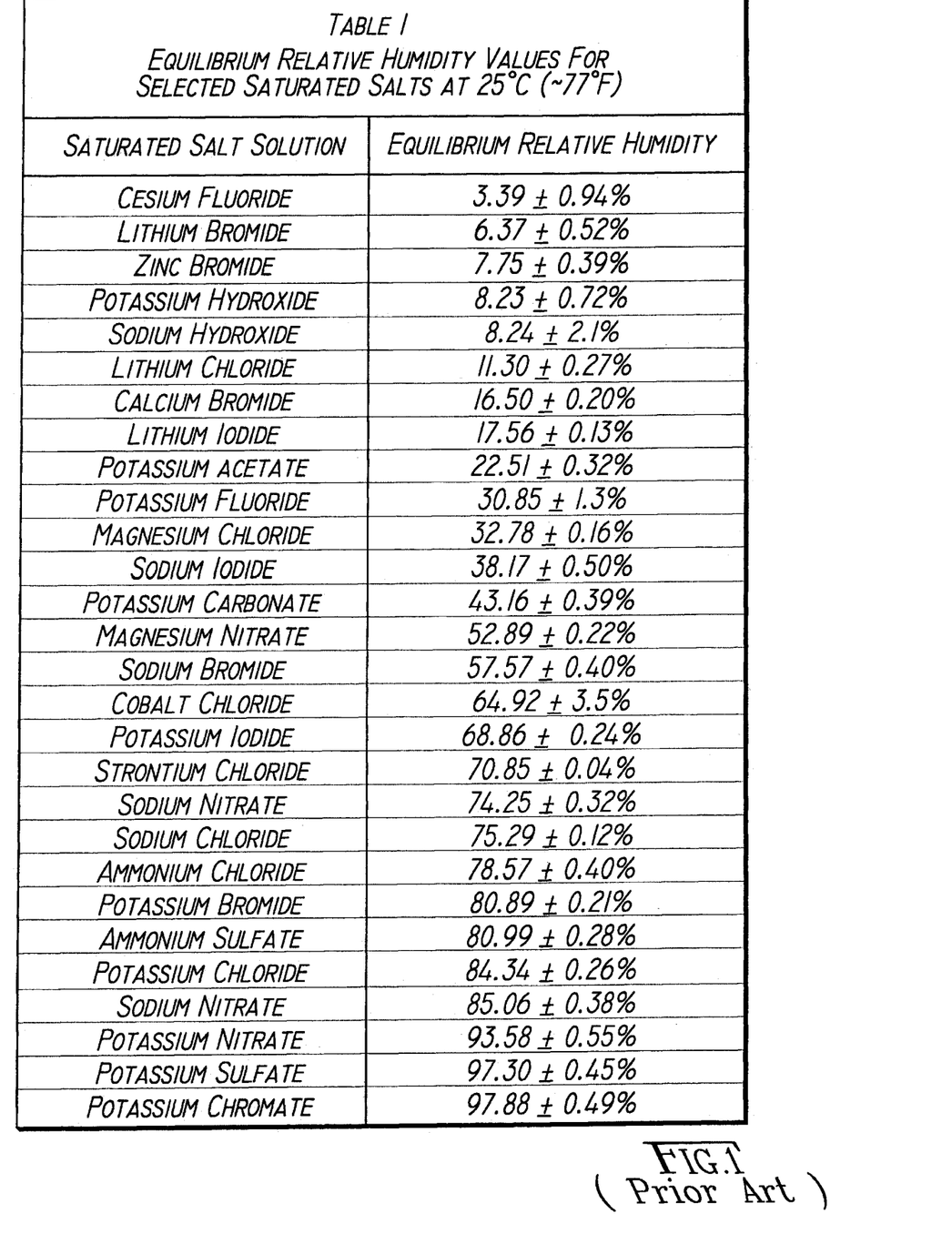
FIG. 1 is a Table in accordance with the prior art listing the equilibrium relative humidity (equilibrium RH) points for the saturated solutions of twenty-eight salts at the same comparison temperature of 25° C. (~77° F.)

FIG. 1 is a Table of "equilibrium relative humidity" values for twenty-eight different salts, taken from the definitive source for at least these salts, Greenspan, L., "Humidity Fixed Points of Binary Saturated Aqueous Solutions," Journal of Research of the National Bureau of Standards—A. Physics and Chemistry, Vol. 81A, No. 1 (January-February 1977). Accordingly, if the jar with the "saturated" solution of pure table salt (NaCl) were at room temperature, FIG. 1 recites that the "equilibrium relative humidity" would be 75.29±0.12%.

An especially useful method of humidity control by chemical system involves the use of binary saturated aqueous solutions (primarily of a single salt) in which the solute is highly non-volatile ['binary . . . solution' here means, one, the water, and two, the salt].

At any temperature, the concentration of a saturated solution is fixed and does not have to be determined. By providing excess solute, the solution will remain saturated even the presence of modest sources or sinks. Where the solute is a solid in the pure phase, it is easy to determine that there is indeed saturation. Due to the ease of its use, this is a popular method of humidity control.

Since a given saturated salt solution provides only one relative humidity (RH) at any desired temperature, a different relative humidity must be achieved by selecting another appropriate salt . . . .

We have [compiled here] data on a sufficient variety of saturated salt solutions to cover the entire range of relative humidity at reasonably close ranges.
Id., at p. 89.

There is more than one downside with saturated solutions. They are messy. Some need long resting times to reach equilibrium. They work best in utilizations where they can be left undisturbed, and their airspace left inaccessible. And so on, with a further downside including that they do not transport well.

To turn to deliquescence, "deliquescence" can likely be thought of as a special instance of a "saturated solution." Every salt listed in FIG. 1 is a deliquescent.

[A simple method for determining the "equilibrium relative humidity" for a salt in a saturated solution] utilizes the fact that a salt crystal will pick up moisture and deliquesce in humiditi.es which are at or above that maintained by its saturated solution. A very small crystal is introduced into the closed chamber and observed under magnification. If the R.H. [i.e., relative humidity in the closed chamber] is below that [i.e., the "equilibrium relative humidity"] for the salt, there will be no change; if it is above, the crystal will liquefy quite rapidly. However, if the R.H. [i.e., relative humidity in the closed chamber] is very close [to the "equilibrium relative humidity" for the salt], the deliquescence will only be partial; if a bit lower, the surface [of the crystal] will become smooth and shiny; if just above, there will be a narrow rim of liquid around the mass.
[Emphasis supplied.]

Winston, P. W. and D. H. Bates, "Saturated Solutions for the Control of Humidity in Biological Research," Ecology, Vol. 41, No. 1 (January 1960), pp. 232-37; at p. 232.

Deliquescence is simply the water condensate uptake by a water-soluble substance, to thereafter dissolve in the condensate and form a solution. In the reverse direction, this is called efflorescence. "Efflorescence" is gaseous-phase water loss from the solution, which thus precipitates crystal.

If the relative humidity in the environment is below the "equilibrium relative humidity" for a salt, it will remain crystal. If slightly above, the salt will deliquesce. To return to the problems of a salt shaker, let's assume it is filled three-fourths full with pure table salt (NaCl). If the relative humidity in the restaurant is below 75%, everything is fine. The table salt will remain crystalline. But if the relative humidity in the environment would rise slightly above, the salt crystals would begin to deliquesce. What happens next is that, the salt is commonly referred to as having "caked."

Accordingly, salt manufacturers add a non-deliquescing desiccant to combat this, namely, calcium silicate. As an extra measure of insurance, restaurants in really humid areas are further known to throw in a few grains of rice.

Pause can be taken to briefly to review some terminology with reference to deliquescents. The threshold relative humidity that a deliquescent deliquesces is called its "deliquescent relative humidity (DRH)."

The "deliquescent relative humidity (DRH)" for a salt is equal to its "equilibrium relative humidity" of its saturated solution.

For salt mixtures, this threshold value is a little blurred.

It appears that there might be two (2) threshold values. One threshold value might be at the onset of water uptake, or else just the full dissolution of the solids into solution (with no solids remaining) for arbitrary fractional percentages of the admixture. It appears that one study refers to this as the "mutual deliquescence relative humidity (MDRH)." See, e.g., Yang, L., R. T. Pabaln, and M. R. Juckett, "Deliquescence Relative Humidity Measurements Using an Electrical Conductivity Method," Journal of Solution Chemistry, Vol. 35, No. 4 (April 2006), pp. 583-604.

The other threshold value might be when the system becomes fully deliquesced, and no solids remain, or else is the specific admixture is at the optimized admixture to produce the lowest humidity that the components can mutually go into full solution. This study appears to call this the "eutonic DRH." So either the terms "mutual DRH" and "eutonic DRH" refer to same thing. Or else the "eutonic DRH" is a special case of "mutual DRH," seemingly being an optimized minima of "mutual DRH" values for a composition which can be blended in various fractions.

In a mixed system, the lowest humidity at which the two components can mutually go into solution is defined at as the eutonic DRH. The ratio of one component to the other in solution at this RH is the eutonic composition. Theory predicts that other mixed compositions will take up some water at the DRH of the eutonic, while some solid will remain in the solution until the RH is increased to the DRH of the composition of interest, then the system becomes fully deliquesced and no solids remain.

... The DRH we report refers to full deliquescence rather than the onset of water uptake.

Brooks, S. D., M. E. Wise, M. Cushing and M. A. Tolbert, "Deliquescence behavior of organic/ammonium sulfate aerosol," Geophysical Research Letters, Vol. 29, No. 19 (October 2002), pp. 23-1 thru 23-4; at page 23-1.

The data of that study showed that, what they called the "eutonic DRH" of a "eutonic composition" of ammonium sulfate in the presence of another electrolyte, will always be lower than the DRH of both ammonium sulfate and the other electrolyte (i.e., lower than the DRH of the deliquescent with the lowest DRH, and not some value in between).

The shortcomings with deliquescents for humidity control can be illustrated by returning to the problems with the salt shaker. The salt can cake during deliquescence, the harm of that being that it might slow the rate of response to further humidity rises. And, given a moderate amount of time, the process ends in a puddle of salt water with no solids remaining. So there is not only a problem with a corrosive fluid evolving but also a finite time span of effectiveness at holding the "deliquescence relative humidity." The salt water puddle will continue with the endless cycle of uptake and loss of water vapor, but it won't hold a constant humidity.

What is needed is an improvement over the shortcomings of the prior art.

SUMMARY OF THE INVENTION

The present invention relates to a humidity control system comprising a solid phase particulate composite enclosed in a container having a limited environment, wherein the solid phase particulate composite comprises a particulate micro-galvanic couple and a deliquescent solid. The deliquescent solid has a deliquescence relative humidity value, and the particulate micro-galvanic couple comprises particles of at least one less active conductor and particles of at least one more active metal conductively and fixedly bonded together. The particles of at least one less active conductor and the particles of at least one more active metal retain their unique nature when conductively and fixedly bonded together. The container has a container relative humidity, and when the container relative humidity is at or above the deliquescence relative humidity value, the solid phase particulate composite is activated without contacting liquid water. Water vapor is removed from the container by reacting the water vapor and the more reactive metal to form at least one metal hydroxide and hydrogen gas, and the solid phase particulate composite remains a solid as it removes water vapor from the container.

In a preferred embodiment, the humidity control system's micro-galvanic couple comprises from about 0.1 to 20.0 wt. % less active conductor and from about 99.9 to 80.0 wt. % more active metal; the solid phase particulate composite comprises from about 0.07 to 10.0 wt. % deliquescent solid and from about 99.93 to 90.0 wt. % particulate micro-galvanic couple; and the greatest dimension of the particulate micro-galvanic couple is in the range of from 0.2 mm to 6 mm.

In a more preferred embodiment, the humidity control system further comprising a pre-hydrated thickening additive that releases water vapor into the limited environment when the control system relative humidity drops near or below the deliquescence relative humidity.

It is an object of the invention to utilize properties of micro-galvanic couples, deliquescent materials and molten salt electrolytic reduction of metal oxides.

Micro-galvanic couples are conductively bonded particles of dissimilar conductors that are relatively far apart on the electrochemical series (e.g., the galvanic series for salt water and/or the reactivity/activity series for metals). These particles although bonded retain their unique nature. The process of making these micro-galvanic couples is often referred to as mechanical alloying, even though the process does not produce what is conventionally called an alloy. The relationship of these conductors in their micro-galvanic couple is more aptly described as an electrically conductive complex. The mechanical alloying production process had traditionally been accomplished by repeatedly flattening, fracturing and cold welding the metal (as well as non-metal conductors) powders in ball mills with inert atmospheres.

Deliquescent materials absorb water from the environment and dissolve in the absorbed water at or above a specific relative humidity to produce a saturated salt solution.

It is another object of the invention to produce essentially solid composite materials that will maintain the relative humidity in an enclosed space or nearby vicinity below a design point or within a design range. The composites are composed of deliquescent substances, a plurality of micro-galvanic couples and if necessary additives which change electrical conductivity, thicken (or gel) the deliquescent solutions and or modify deliquescence relative humidity (DRH) and/or mutual deliquescence relative humidity (MDRH), as applicable.

It is an additional object of the invention to produce an essentially solid composite material that will maintain the relative humidity in an enclosed space, semi-enclosed space or a nearby vicinity (i.e., and environment) over a significant period of time below a design relative humidity point and have a substantial capacity for additional water.

It is a further object of the invention to produce the products hereof by an inventive method to make the micro-galvanic couples (molten salt electrolytic reduction of metal oxides) using which have current existing applications beyond maintaining relative humidity in an enclosed space or nearby vicinity with in a design range. These couples will also have applications as means to undertake electro-catalytic hydrogenation, and be portable means to produce hydrogen gas.

It is an alternative object of the invention to make a plurality of relatively small micro-galvanic couples which in aggregate provide a greater surface area and are more efficiently consumed in salt solutions.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings:

FIG. 11 is diagrammatic view of a processing tank in accordance with the invention for electrochemically reducing bound oxides particles to produce micro-galvanic couples (for example, relatively dense 26 particles containing magnesium oxide and a smaller fraction of iron oxide are propelled against the cathode with a stream of argon bubbles through the molten LiCl—KCl bath at a temperature below the melting point of magnesium metal; on contact with the cathode, the content of the particles are reduced to interspersed porous deposits 24 of magnesium and iron metals, which are almost in a foamy state, or else a deeply pitted state; and also since in this case the particles that have been reduced are less dense than the molten salt, or else since they are foamy or pitted, then they might contain pockets of the Argon gas, they tend with agitation to go more readily to the top of the melt where they can be extracted)

DETAILED DESCRIPTION OF THE PREFERRED EMBODIMENTS

Figure 3:
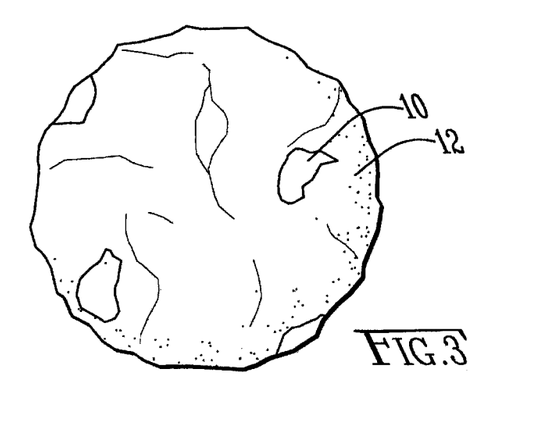
FIG. 3 is a perspective view of a micro-galvanic couple in accordance with the invention that is produced by mechanical alloying (cold welding) powders relatively of at least two metals that are far apart on the electrochemical series, and this mechanical alloying is done in ball mills or the like (the less active electrically conductive material particles 10 are preferably selected from any of Fe, Ni, Cr, Co, Sn, Pb, Ti, Cu, Pd, Pt, Ag, Au, C or combinations thereof; the more active electrically conductive material particles 12 from Mg, Al, Zn, Ca, Na, K, Li or any alloy where one of these are dominate.

FIG. 3 shows a preferred micro-galvanic couple particle that in accordance with the invention that is produced by mechanical alloying (cold welding) powders of conductors that are relatively far apart on the electrochemical series (and the galvanic series for salt water). The electrochemical series shares a relationship with the 'reactivity' or 'activity' series for metals. Generally the same materials are in the same order. Except that, given different electrolytes, neighboring materials can change in the lineup. Nevertheless, metals which are far apart are never going to swap being on the opposite side of each other in terms of relative activity.

For example, among the alkali metals, Lithium and Sodium are known to swap places in certain series of certain electrolytes. And among the noble metals, gold and platinum are known to invert too. But no noble metal inverts with any alkali or alkaline earth metal in any series. Again, if the galvanic couples are made of a more active metal and a less active conductor (metal/carbon; which are relatively far apart on the galvanic series for salt water, then various objects of the invention will be satisfied.

Mechanical alloying (cold welding) has traditionally been done in ball mills in an inert atmosphere. Less active electrically conductive material particles (less active conductor) 10 include materials such as Fe, Ni, Cr, Co, Sn, Pb, Ti, Cu, Pd, Pt, Ag, Au, C or combinations thereof. (Fe, Iron; Ni, Nickel; Cr, Chromium; Co, Cobalt; Sn, Tin; Pb, Lead; Ti, Titanium; Cu, Copper; Pd, Palladium; Pt, Platinum; Ag, Silver; Au, Gold; and C, Carbon.) More active electrically conductive material particles (more active metal) 12 include metals such as Mg, Al, Zn, Ca, Na, K, Li or any alloy where one of these are dominate. (Mg, Magnesium; Al, Aluminum; Zn, Zinc; Ca, Calcium; Na, Sodium; K, Potassium; and Li, Lithium.) That is, the more active electrically conductive materials preferably include the alkali and alkaline earth metals, plus aluminum and zinc. It is believed that the selection of zinc would also perhaps necessitate the selection of nickel or a nickel alloy as its pair.

A mixing of loose particles of the more active metal with the less active conductor, not conductively and fixedly bonded together will fail to work for this invention. It is required that the active metal with less active conductor be conductively and fixedly bonded together, such as by cold welding for the rapidly occurring reaction to take place.

The particle size of the more active metal and the less active conductor is also critical to the functioning of the solid phase particulate composite. A preferred composite particulate size is in the range of about 0.2 mm to 6.0 mm. Above 6.0 mm, the composite fails to function as the reaction to remove moisture is unacceptably slow. Below the 0.2 mm, the increased surface area causes the composite to be overly reactive and hazardous. Extreme heat can be generated. The composite, when reacting with water vapor, creates heat as it produces hydrogen, a volatile gas. This combination of excessive heat and hydrogen gas creates an unacceptably hazardous condition.

The amounts of the less active conductor and the more active metal are critical. Preferably, the less active conductor is present in the micro-galvanic couple particle in the range of about 0.10 to 20.0 wt. %. Preferably, the more active metal is present in the micro-galvanic couple particle in the range of about 99.9 to 80.0 wt. %. More preferably, the less active conductor is present in the micro-galvanic couple particle in the range of about 0.10 to 10.0 wt. %, and the more active metal is present in the micro-galvanic couple particle in the range of about 99.9 to 90.0 wt. %. Most preferably the less active conductor is present in the micro-galvanic couple particle in the range of about 1.0 to 5.0 wt. %, and the more active metal is present in the micro-galvanic couple particle in the range of about 99.0 to 95.0 wt. %.

Further, the amounts of combined micro-galvanic couple particle with the deliquescent solid is critical. Preferably, the particulate deliquescent solid is present in the solid phase particulate composite in the range of about 0.07 to about 10.0 wt. %, and the particulate micro-galvanic couple is present in the range of about 99.93 to about 90.0 wt. %. More preferably, the deliquescent solid is present in the solid phase particulate composite in the range of about 0.07 to about 2.0 wt. %, and the particulate micro-galvanic couple is present in the range of about 99.93 to about 98.0 wt. %.

Figure 4:
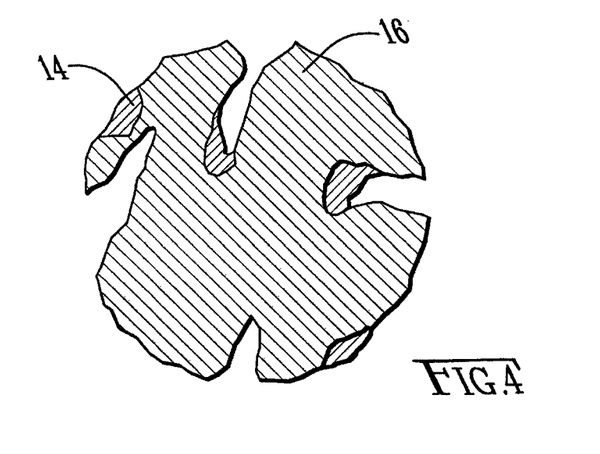
FIG. 4 is a sectional view of a micro-galvanic couple in accordance with the invention and comparable to FIG. 3 except the micro-galvanic couple of this view is produced by electrolytic reduction of a bound mixture of oxides (e.g., oxides of magnesium and iron in this example) in a molten salt electrolysis apparatus, wherein porous deposits of a less active electrically conductive material (or C) 14 are preferably selected from Fe, Ni, Cr, Co, Sn, Pb, Ti, Cu, Pd, Pt, Au, C or combinations and are coupled with porous deposits of a more active electrically conductive material 16 such as Mg, Al, Zn, Ca, Na, K, Li or any alloy where one of these are dominate, and see detail IV-IV in FIG. 11.

FIG. 4 shows a micro-galvanic couple particle that is more preferred still for this invention. This particle is produced by electrolytic reduction of a bound mixture of metal oxides and or other conductors. The particle is primarily composed of porous deposits of materials 14 and 16. Material 14 is a less active electrically conductive material such as Fe, Ni, Cr, Co, Sn, Pb, Ti, Cu, Pd, Pt, Au, C or combinations thereof. Material 16 is a more active electrically conductive material such as Mg, Al, Zn, Ca, Na, K, Li or any alloy where one of these are dominate.

Figure 5:
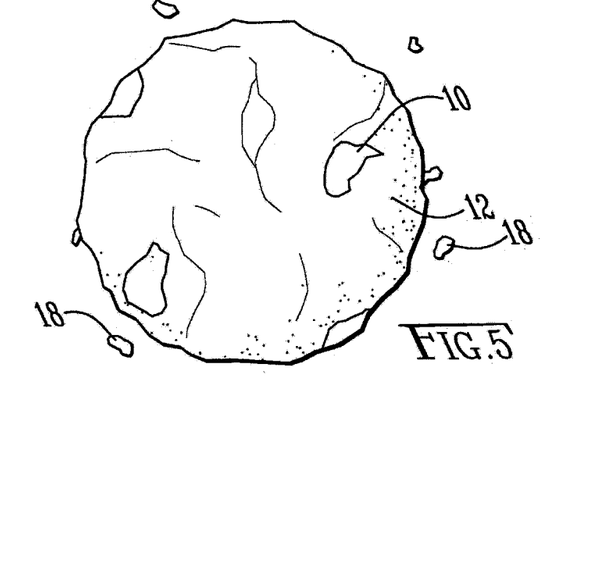
FIG. 5 is a perspective view of the particle of FIG. 3 except blended with at least one deliquescent substance.
Figure 6:
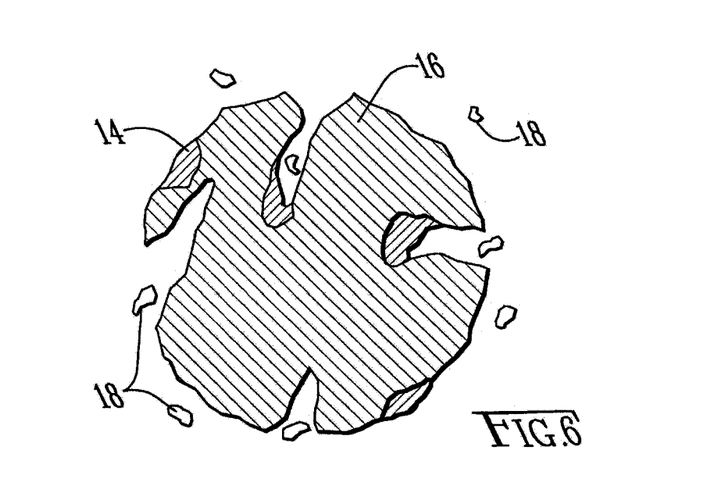
FIG. 6 is a sectional view of the particle of FIG. 4 except blended with at least one deliquescent substance.

FIGS. 5 & 6 show the composite materials comprising a micro-galvanic couple (of FIGS. 3 & 4) blended with deliquescent substance(s) 18.

Figure 7:
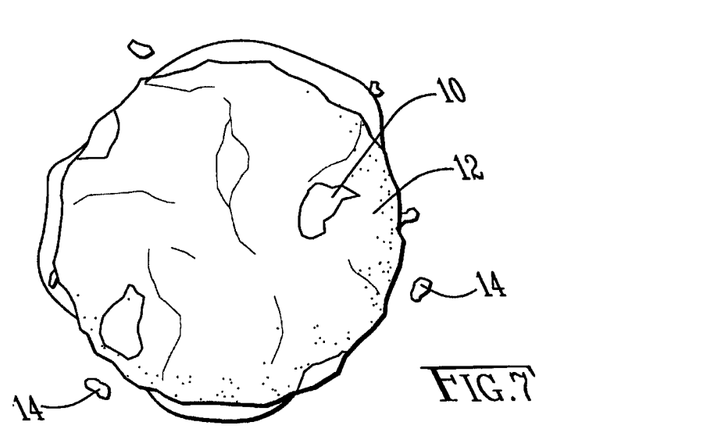
FIG. 7 is a perspective view of the particle of FIG. 5 except not only blended with at least one deliquescent substance but also blended with some thickening agent for the deliquescent solution and/or an electrical conductivity additive.
Figure 8:
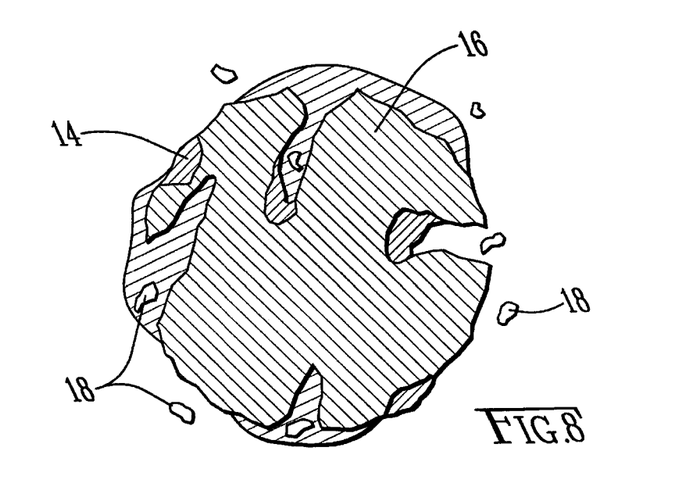
FIG. 8 is a sectional view of the particle of FIG. 6 except not only blended with at least one deliquescent substance but also blended with some thickening agent for the deliquescent solution and/or an electrical conductivity additive.

FIGS. 7 & 8 show the composite materials comprising a micro-galvanic couple (of FIGS. 5 & 6) blended not only with deliquescent substance(s) 18 but also with some thickening agent for the saturated deliquescent solution and/or an electrical conductivity additive.

The thickening additives not only limit the deliquescent solutions mobility and facilitate the release of moisture if necessary from the sequestered deliquescent solution when the space or nearby vicinity's relative humidity drops below the deliquescence relative humidity point of the deliquescent substance(s), but they can also absorb hydrogen via electrocatalytic hydrogenation and thereby serve as hydrogen sequestration compounds. Hydrogen is produced when galvanic couples react with conductive aqueous solutions.

The possible thickening additives (i.e., hydrogen sequestration compounds) for this invention are very broad and diverse. Some of the possible thickening additives include without limitation alkenes, alkynes, ketones, aldehydes, esters, imines, nitriles, nitro compounds, unsaturated hydrocarbons, unsaturated fats, aromatics, carbohydrates, hydrophilic polymers, cellulose, clay, carbohydrate gelling agent, protein gelling agent and or hydrocolloid gum that can be hydrated in deliquescent substance(s) solutions around room temperature.

Figure 9:
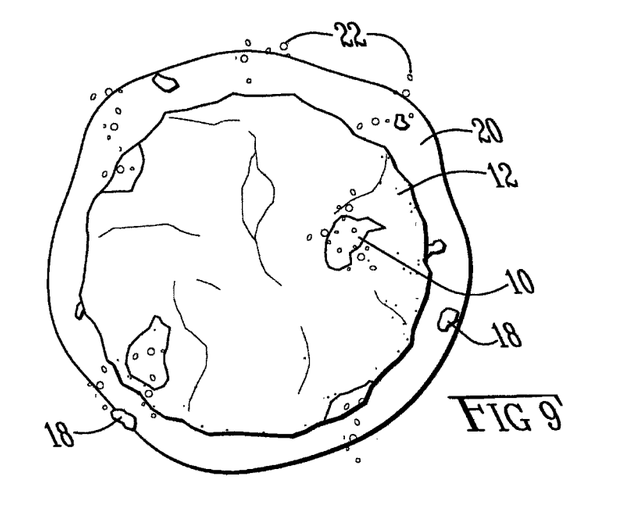
FIG. 9 is a perspective view of the blended particle of FIG. 5 except showing the particle being exposed to relative humidities in excess of the deliquescence relative humidity (DRH) point of the deliquescent substance(s) present, wherein a film 20 of deliquescent solution (and if desired gelling agent) created from absorbed environmental moisture, hydrogen gas 22 released from galvanic consumption of the more active materials 12 and water absorbed from the environment in the film 20 of deliquescent solution.
Figure 10:
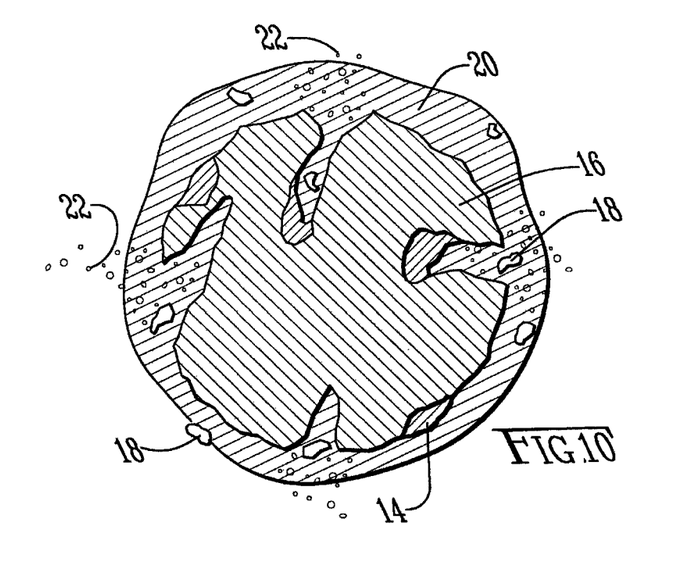
FIG. 10 is a sectional view of the blended particle of FIG. 6 except showing the particle being exposed to relative humidities in excess of the deliquescence relative humidity (DRH) point of the deliquescent substance(s) present, wherein a film 20 of deliquescent solution (and if desired gelling agent) created from absorbed environmental moisture, hydrogen 22 gas released from galvanic consumption of the more active metal 16 and water absorbed from the environment in the film 20 of deliquescent solution.

FIGS. 9 & 10 show the composite materials of FIGS. 5 & 6 after the materials have been exposed to a relative humidity in excess of the unique deliquescent relative humidity (DRH) point of the deliquescent substance(s) present. A film 20 of saturated deliquescent solution (and if desired, a gelling agent) created from absorbed environmental moisture. Hydrogen 22 gas released from galvanic consumption of the more active materials (16 & 12) and water absorbed from the enclosed space, semi-enclosed space or nearby vicinity (i.e., an environment) in the 20 film of saturated deliquescent solution.

Figure 11:
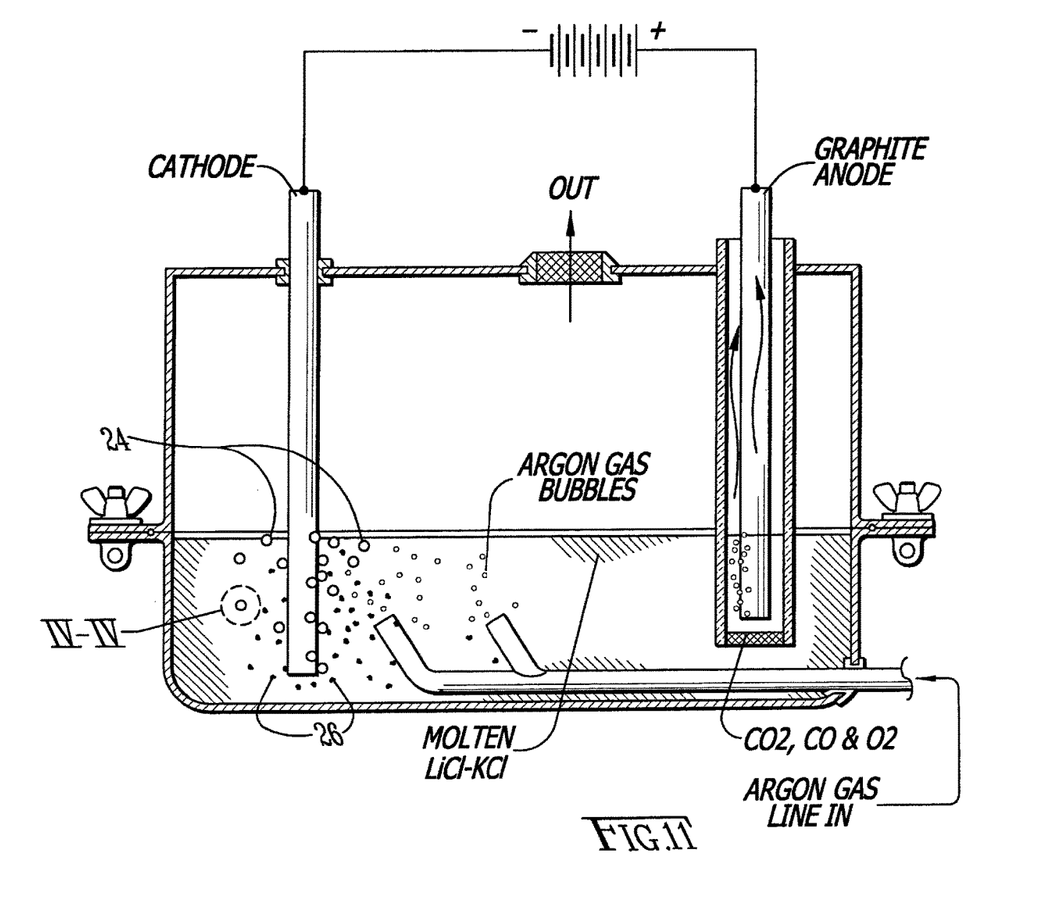

FIG. 11 shows a processing tank for electrochemically reducing bound metal oxide particles to produce micro-galvanic couples. For example, relatively dense 26 particles containing magnesium oxide and a smaller fraction of iron oxide are propelled against the cathode with a stream of argon bubbles through the molten LiCl—KCl bath at a temperature a little below the melting point of magnesium metal. On contact with the cathode the content of the particles are reduced to interspersed porous deposits 24 of magnesium and iron metals. Since in this specific case the particles that have been reduced are less dense they tend with agitation to go more readily to the top of the melt where they can be extracted.

Additional aspects of FIG. 11 include the following. The anode is inserted in a sleeve of a cylindrical glass frit. The glass sleeve provides an annular channel to let the evolving gases which can be any of $CO_2$, CO or $O_2$ to rise and vent away from the main molten salt bath (or at least away from the cathode and metal being formed there).

Bound metal oxide particles are inputted into the molten salt bath, it is believed that the metal produced by this electrolysis will have a pumice like structure due to the removal of oxygen. There are advantages to obtaining such a structure for the metals. The most important of which is enhanced buoyancy. In most cases the reduced metals are more buoyant in the molten salt bath than the oxides and will float or can be coerced to the top after forming, but they might not. They might stick fast to the cathode. So if a steady stream of Argon bubbles, or better, nozzles shooting jets of argon streams are aimed at the forming deposits on the cathode can be loosened off. Entrained bubbles of argon will further help carry the metals to the surface.

It is an aspect of the invention to extract the buoyant metals with a moderate amount of the molten salt encrusted thereto. It is a desirable aspect of the invention that solidified salt will fill cavities in the micro-galvanic cells. The prior art way of extracting the metals is allowing them to sink to the bottom of the bath. Then let the bath cool until the bath hardens. After that, the hardened cake of salt and metal is rinsed under water until the salt is washed away, and the metal remains.

That will not do for galvanic couples unless a non-conducting solvent is used. Galvanic couples have to be extracted without the rinsing procedure. It is preferred to perform electrolysis in a molten salt bath such that the reduced metal particles 24 are relatively buoyant, allowing extraction at the surface (or near surface). While the molten salt is still liquid, the extracted material might be agitated to fling off some of the molten salt, except, not too vigorously. It is an aspect of the invention that some of the molten salt is allowed to remain and then harden in the interstices of the reduced particles. It is another aspect of the invention that, prior to use, the micro-galvanic particles produced in accordance with FIG. 11 are pre-loaded with salt.

Figure 2:
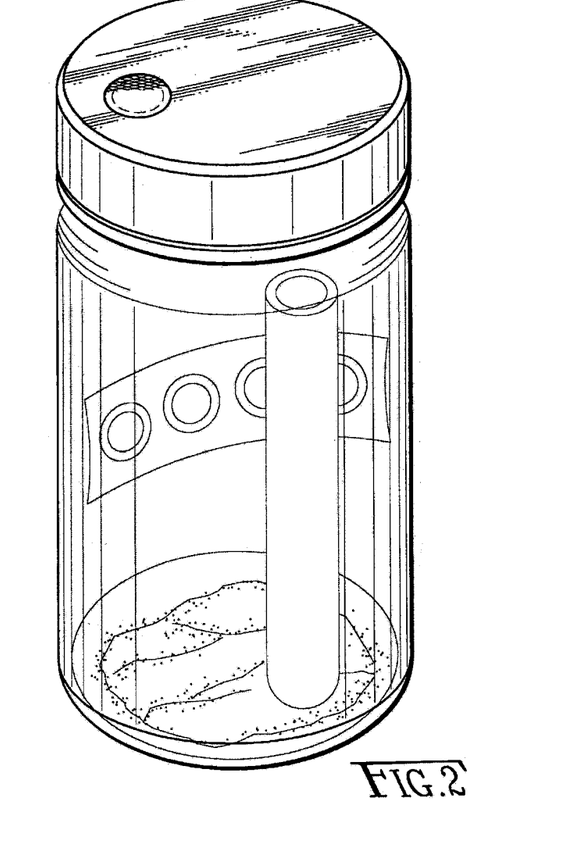
FIG. 2 is a perspective view of an actual proof-of-concept test of the humidity control products in accordance with the invention, wherein as tested inside a ~500 ml mason jar that served as the control "environment;"

FIG. 2 shows an actual test (EXAMPLE 1) of the effectiveness of the particles in accordance with FIGS. 3, 5, 7 and 9.

Example 1

The control 'environment' comprises a sealed Mason jar with about ~500 ml capacity (or about an imperial pint). The lid had with a ¼"(~0.6 cm) hole in the cap. This hole was sealed with a 2 mil PE film. The PE film was intended to allow hydrogen gas to escape by diffusion and at the same time reduce any exchange of water vapor from outside the jar. The gray granular solid in the bottom of the jar is a composite material that maintained the relative humidity in the jar for in excess of 60 days at approximately 9% relative humidity (at an average of 25° C.). Humidity was measured by a 3M® humidity indicator card.

About twenty (20) grams of the composite material was sprinkled into the bottom of the jar. The composite material consists of 90.09% cold welded micro-galvanic magnesium/iron couples, 7.58% lithium chloride, 0.45% potassium chloride, 0.08% modified starch and 1.80% water. The Mg/Fe couples contained 89.9 wt. % Mg and 10.1 wt. % Fe. The particles were sieved with a +60 mesh sieve, (0.25 mm) before coating with a salt solution. The starch and water made a gel.

An open test tube of water was inserted inside the jar. The test tube of water provided a source of water vapor inside the environment, since it was believed that the PE film over the hydrogen vent would operate as a check valve, i.e., hydrogen allowed out, but moisture blocked from getting in. No liquid water contacted the composite material. Therefore, one interest in the test was to see how long the composite material could hold a constant humidity in a closed environment that nevertheless had a source of humidity.

The water in the test tube progressively over time was reacted and the jar had to be opened once to refill it with water. For the sake of keeping a real time idea of the humidity in the jar without opening it or penetrating the seal, a commercial humidity indicator card that (i.e., 3M® brand) was inserted in the jar (not shown) and which could be through the glass of the jar.

Once again, the results were, the composite materials held the relative humidity in the jar at 9% for over 60 days (after which the experiment was just simply terminated). The composite material appeared dry during the experiment.

To repeat from above, the deliquescent substance used in the composite was LiCl and KCl. And, referring to FIG. 1, the 'deliquescent relative humidity (DRH)' for pure LiCl is about 11%. The relative humidity held in the jar was a measured 9%.

What evidently happens is this. The deliquescent absorb humidity out of the environment and deliquesce, thus providing the galvanic couples with a salt solution. Through an electrochemical process the active metal reacts with the salt solution. That is, the more active metal strips the salt solution of water molecules, forming a metal hydroxide and hydrogen. The saturated salt solution having now been stripped of water molecules, precipitates some fraction of itself back into solid phase deliquescent. And the process can repeat, indefinitely, until the more active metal is depleted.

It is believed the results were very much a success. Twenty (20) grams of a composite material which was substantially magnesium, held a 500 ml environment at 9% relative humidity for 60 days, and, no end was in sight when the test was just quit.

Example 2

Example 2 was prepared to demonstrate the safe functioning of the claimed invention, even in the presence of liquid water. Micro-galvanic couple particles were prepared from Mg/Fe particles ball milled together to form conductively and fixedly connected particles. The Mg/Fe contained 89.9 wt. % Mg and 10.1 wt. % Fe. The particles were washed in water and vacuumed dry. They were then washed in methanol and dried again to remove all traces of water. The particles were sieved with a +60 mesh sieve, (0.25 mm). The particles were mixed with a cold methanol (with a small fraction of water) solution of NaCl and KCl and vacuum dried to form a 0.14 wt. % salt coating deposited on the surface of the micro-galvanic particles creating a solid phase particulate composite. Liquid water was introduced to the solid phase particulate composite resulting in a slow steady reaction, but no significant heat or steam was created. The liquid water reacted to form hydrogen gas and magnesium hydroxide and it took about 6 hours to complete.

It is important to note that this is a safety demonstration, and that in the absence of liquid water, the present invention would effectively control relative humidity.

Control 1

The Mg/Fe micro-galvanic particles of EXAMPLE 2 were coated with a 6 wt. % NaCl coating. The coated particles were sieved with a +120 mesh screen (0.125 mm). This was a much higher amount of salt, and about half the particle size of the solid phase particulate composite of EXAMPLE 2. Liquid water was introduced to the particles and a vigorous reaction occurred with steam and excessive heat generated. The reaction was complete in about 15 seconds.

The particles of the invention as shown by FIGS. 2-10 comprise a composite material that will maintain the relative humidity in an enclosed space, semi-enclosed space or nearby vicinity (e.g., an 'environment') below a design point or with in a design range. The composites are composed of deliquescent substance(s), a multitude of micro-galvanic couples and if necessary additives which change electrical conductivity, thicken (or gel) deliquescent solutions and or modify deliquescence relative humidity (DRH). This composite material can be presented for use as a powder, in a granular state, bound solid, bagged or otherwise containerized forms which are currently used for desiccants and or humectants.

A preferred embodiment of such a composite would be a multitude of micro-galvanic couples composed of Magnesium (12 & 16) and Iron metal (10 & 14) blended with smaller portion of (18) LiCl. When this composite material is exposed to relative humidity at or above LiCl's unique deliquescence relative humidity (DRH), the resulting solution 20 forms an electrolyte bridging the two dissimilar conductors. As long as the relative humidity is at or above LiCl's unique deliquescence relative humidity (DRH) and some (12 & 16) magnesium metal remains a galvanic reaction will continue. Both the moisture accumulated from the enclosed space or nearby vicinity and (12 & 16) magnesium metal are consumed in this galvanic reaction to produce magnesium hydroxide and 22 hydrogen gas.

If a pre-hydrated thickening additive (or gelling agent) is present, it will release moisture if it is significantly below LiCl 18's unique deliquescence relative humidity (DRH) in the enclosed space, semi-enclosed space or nearby vicinity (e.g., environment) when something external drives the relative humidity below LiCl 18's unique deliquescence relative humidity (DRH), and therefore actively maintaining a range of relative humidity around LiCl 18's unique deliquescence relative humidity (DRH). Thickening additives that are appropriate for this invention include alkenes, alkynes, ketones, aldehydes, esters, imines, nitriles, nitro compounds, unsaturated hydrocarbons, unsaturated fats, aromatics, carbohydrates, hydrophilic polymers, cellulose, clay, carbohydrate gelling agent, protein gelling agent and or hydrocolloid gum that can be hydrated with saturated solutions to produce the desired floor RH.

Although Magnesium (12 & 16) and Iron metal (10 & 14) are preferred for micro-galvanic couples in this invention the following may be used.

For the less chemically active electrically conductive material (less active conductor) particles (10 & 14), materials such as Fe, Ni, Cr, Co, Ti, Sn, Pb, Cu, Pd, Pt, Ag, Au, C or combinations thereof may be used.

For the more chemically active electrically conductive material (more active metal) particles (12 & 16), materials such as Mg, Al, Zn, Ca, Na, K, Li or any alloy where one of these are dominate.

The deliquescent substance(s) 18 are chosen in accordance to the relative humidity range the composite is intended to maintain and chemical capability. Those deliquescent substances listed in "Humidity fixed points of binary saturated aqueous solutions", J. of Research, National Bureau of Standards, 81A (1977) pp 89-96 by Lewis Greenspan and "Chemical Maximum Humidity Indicator Update Report" by W. B. Abel (BDX-613-1989 under contract from U.S. Department of Energy DE-AC04-76-DP00613) can be used individually or together for this invention but the chlorides are preferred.

Preferred deliquescents are Mannitol, Sorbitol, Sucrose, Glucose, Dextrin and Cyclodextrins in combination with each other, as well as combinations of compounds composed of the following cations and anions.

CATIONS: Li, Na, K, Rb, Sr, Cs, Mg, and Ca.
ANIONS: F, Cl, Br and I.

Deliquescent systems of the following compounds were tested and did not perform well or were too dangerous or toxic were: Ammonium compounds, Nitrates of the above metals, Chlorates of the above metals, Perchlorates of the above metals, Sulfates of the above metals, Citrates of Na & K, Citric Acid and Malic acid.

Additives which change electrical conductivity which can be included with deliquescent substance(s) 18 in many instances are deliquescent substance(s) unto themselves such as KCl or NaCl. These additives are only limited by their compatibility with the other components of the composite.

The nature and fraction present of deliquescent substance(s) 18 and additive(s) are used to customize the composite for specific applications.

If the composite is to be used as a desiccant the deliquescent substance(s) are selected to deliquesce below 35% relative humidity at 25° C. and the fraction used is only slightly more than what would be necessary to generate a thin film of deliquescent solution over the surface area of the micro-galvanic couples present.

If the composite is to actively maintain the relative humidity (at a temperature) below a design point in an enclosed space or nearby vicinity, the deliquescent substance(s) are selected to deliquesce at or above the desired relative humidity point and the fraction used is only slightly more than what would be necessary to generate a thin film of deliquescent solution over the surface area of the micro-galvanic couples present.

If the composite is to actively maintain the relative humidity (at a temperature) in a design range in an enclosed space or nearby vicinity, the deliquescent substance(s) are selected to deliquesce in the middle of the desired relative humidity range and the fraction used is substantially more than what would be necessary to generate a thin film of deliquescent solution over the surface area of the micro-galvanic couples present. Thickening additives (and or gelling agents) are added to limit the deliquescent solutions mobility and facilitate the release of moisture if necessary from the sequestered deliquescent solution when the space or nearby vicinity's relative humidity drops below the deliquesce relative humidity (DRH) of the deliquescent substance(s). It is beneficial under some circumstances to partially pre-hydrate the thickening additive(s).

The aspects of the invention as shown by FIG. 11 comprise an alternative method to make the micro-galvanic couples which are particularly suited to the first part of this invention. This involves the electrolytic reduction of the content of bound mixed oxide particles 26 to interspersed porous deposits of magnesium and iron metals 24 while remaining in a solid state. This process is bears a relationship to what is described in "Electrochemical Reduction of Tungsten Oxide in Molten LiCl—KCl Using a Novel Fluidised Bed Electrode Approach (Abstract #2421, 224th ECS Meeting, © 2013 The Electrochemical Society)" and U.S. Pat. No. 6,921,473 "Electrolytic reduction of metal oxides such as titanium dioxide and process applications" although the operating temperature is below 700° C. and the objectives are different. This method more distributes deposits of the metals, generates great surface area and intimately blends the couples with deliquescent substances than other known manufacturing means.

In a preferred embodiment, with in an inert gas enclosed space relatively dense particles 26 containing magnesium oxide and a smaller fraction of iron oxide are propelled against the cathode with mechanical stirring or with a stream of argon bubbles through a molten LiCl—KCl bath at a temperature a little below the melting point of magnesium metal. On contact with the cathode the content of the particles are reduced to interspersed porous deposits of magnesium and iron metals 24. Since in this case the particles that have been reduced are less dense they tend with agitation to go more readily to the top of the melt where they can be extracted. The graphite anode is isolated such that the produced $CO_2$, CO and $O_2$ can be discharged without significantly contaminating the inert gas in the enclosed space or nearby vicinity.

For this method in accordance with the invention, the molten salt bath can consist of LiCl or mixtures of halogen salts which are compatible with the other components present and melt below 700° C.

It is an aspect of the invention to produce and/or utilize the following:
  (1) An essentially solid composite desiccant material with consistent affinity and substantial capacity for water. Composed of micro-galvanic couples and deliquescent substance(s);
  (2) The deliquescent substance(s) in item 1 above is preferably LiCl, $MgCl_2$, $CaCl_2$), NaCl, KCl or combinations thereof;
  (3) The less chemically active component (less active conductor) of the micro-galvanic couples in item 1 above may be Fe (or its alloys) and the more chemically active metal (more active metal) is Mg (or its alloys).

It is an alternative aspect of the invention to produce and/or utilize the following:
  (I) An essentially solid composite material that will actively maintain the relative humidity (at a temperature) below a design point, in an enclosed space or nearby vicinity over a significant period of time and have a substantial capacity for additional water. Composed of micro-galvanic couples and deliquescent substance(s);
  (II) The deliquescent substance(s) in item I above is preferably any deliquescent substance or mixture that can produce a solution with an electrical conductivity of 3.5 siemens per meter or greater at 25° C.;
  (III) The less chemically active component (less active conductor) of the micro-galvanic couples in item I above is preferably any of Fe, Ni, Cr, Co, Ti, Sn, Pb, Cu, Pd, Pt, Ag, Au, C or combinations thereof and the more chemically active metal (more active metal) is preferably any of Mg, Al, Zn, Ca, Na, K, Li or any alloy where one of these are dominate.

It is a further alternative aspect of the invention to produce or use the following:
  (A) An essentially solid composite material that will actively maintain the relative humidity (at a temperature) with in a design range, in an enclosed space or nearby vicinity over a significant period of time and have a substantial capacity for additional water, and comprising micro-galvanic couples and deliquescent substance(s);
  (B) The deliquescent substance(s) in item "A" above is preferably any deliquescent substance or mixture that can produce a solution with an electrical conductivity of 3.5 siemens per meter or greater at 25° C.;
  (C) The less chemically active component (less active conductor) of the micro-galvanic couples in item "A" above is preferably any of Fe, Ni, Cr, Co, Ti, Sn, Pb, Cu, Pd, Pt, Ag, Au, C or combinations thereof and the more chemically active metal (more active metal) for the most part is preferably any of Mg, Al, Zn, Ca, Na, K, Li or any alloy where one of these are dominate.
  (D) The addition of a thickening additive (or gelling agent) to the composite in item "A" is above is preferably any of the following: alkenes, alkynes, ketones, aldehydes, esters, imines, nitriles, nitro compounds, unsaturated hydrocarbons, unsaturated fats, aromatics, carbohydrates, hydrophilic polymers, cellulose, clay, carbohydrate gelling agent, protein gelling agent and or hydrocolloid gum that can be hydrated with saturated solutions to produce the desired floor RH.

It is a still another alternative aspect of the invention to produce or use:
  (i) A means to create micro-galvanic couples by the electrolytic reduction of bound mixed oxides in molten salts in an inert gas enclosed space below 700° C.;
  (ii) The molten salts in item "i" above can be any mixtures of halogen salts and oxides of Li, Ba, Ca, Na and K that melt below 700° C.;
  (iii) The mixed oxides in item "i" above can be selected from the oxides of the following: Fe, Ni, Cr, Co, Ti, Sn, Cu, Mg, Al, and Zn; and
  (iv) Further a preference for the inclusion of dispersed graphite in the mixed oxides of item "i" above.

Figure 12:
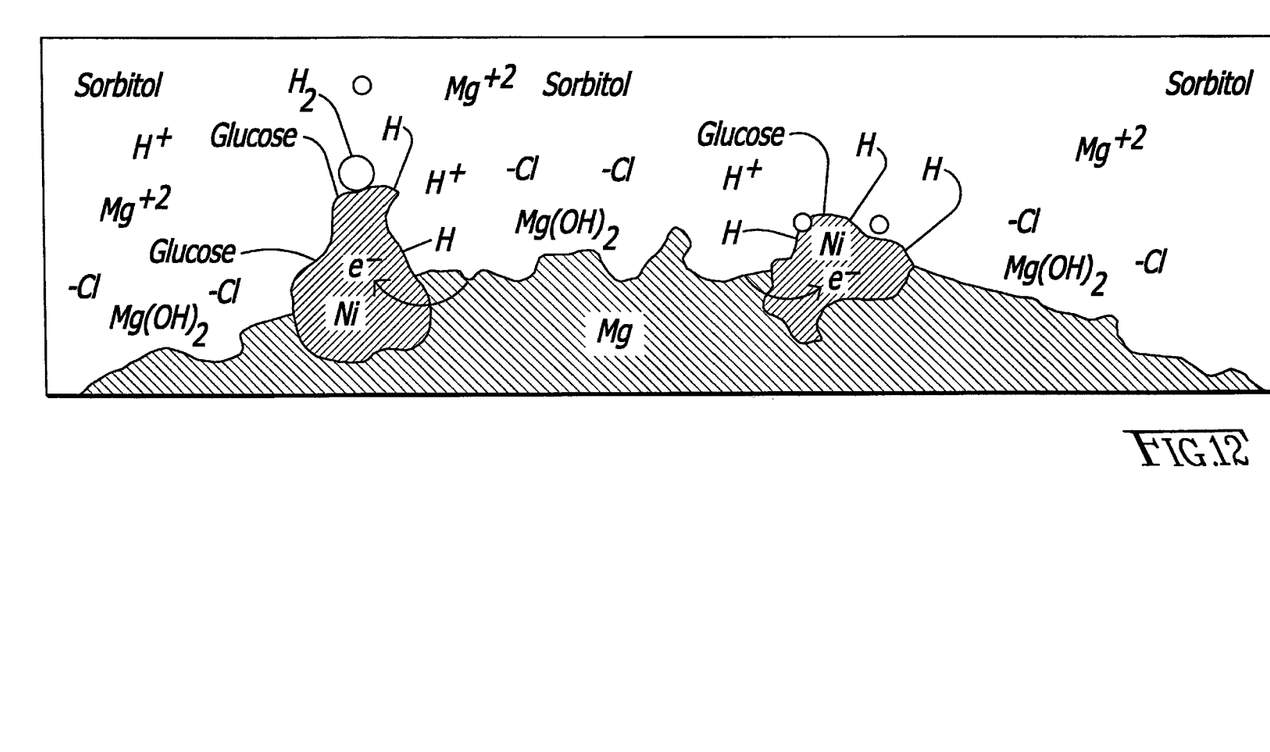
FIG. 12 is diagrammatic view showing the galvanic couples in accordance with the invention being utilized in a hydrogenation process.

FIG. 12 is diagrammatic view showing the galvanic couples in accordance with the invention being utilized in a hydrogenation process.

It is a further aspect of the invention to undertake electrocatalytic hydrogenation through utilization of galvanic couples.

As described above in connection with FIGS. 7 and 8, thickening additives not only limit the deliquescent solutions mobility and facilitate the release of moisture if necessary from the sequestered deliquescent solution when the space or nearby vicinity's relative humidity drops below the deliquescence relative humidity point of the deliquescent substance(s), but they can also absorb hydrogen via electro-catalytic hydrogenation and thereby serve as hydrogen sequestration compounds. Hydrogen is produced when galvanic couples react with conductive aqueous solutions.

However, electro-catalytic hydrogenation for purposes of hydrogen sequestration can be an independent utilization of the galvanic couples in accordance with the invention. In other words, the galvanic couples in accordance with the invention would be used for the purposes of electro-catalytic hydrogenation, and not in combination with humidity control.

In electro-catalytic hydrogenation, hydrogen sequestration of the chemisorbed hydrogen on the catalytic conductor of the galvanic couples is generated by electroreduction of water under ambient pressure as per the Volmer reaction. In competition with electrochemical and chemical hydrogen generation, the adsorbed sequestration compound glucose in the example is hydrogenated to sorbitol or 2-deoxysorbitol in the example. Thereby binding some of the hydrogen.

The possible thickening additives (i.e., hydrogen sequestration compounds) for this invention are very broad and diverse. Some of the possible thickening additives include without limitation alkenes, alkynes, ketones, aldehydes, esters, imines, nitriles, nitro compounds, unsaturated hydrocarbons, unsaturated fats, aromatics, carbohydrates, hydrophilic polymers, cellulose, clay, carbohydrate gelling agent, protein gelling agent and or hydrocolloid gum that can be hydrated with saturated solutions to produce the desired floor RH.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method of electrocatalytic hydrogenation of a reactant, comprising:
   electrocatalyzing the reactant with a particulate micro-galvanic couple and hydrogen to form a metal compound and a hydrogenated reactant,
   wherein the particulate micro-galvanic couple comprises particles of at least one less active conductor and particles of at least one more active metal conductively and fixedly bonded together; and
   wherein the particles of the at least one less active conductor and the particles of the at least one more active metal retain their natural properties when conductively and fixedly bonded together.

2. The method of claim 1, wherein the micro-galvanic couple comprises from about 0.1 to 20.0 wt. % the less active conductor and from about 99.9 to 80.0 wt. % the more active metal.

3. The method of claim 1, wherein the reactant is selected from the group consisting of alkenes, alkynes, ketones, aldehydes, esters, imines, nitriles, nitro compounds, unsaturated hydrocarbons, unsaturated fats, aromatics, carbohydrates, hydrophilic polymers, cellulose, clay, carbohydrate gelling agent, protein gelling agent and hydrocolloid gum.

4. The method of claim 1, wherein particles of the at least one less active conductor and particles of the at least one or more active metal are conductively and fixedly bonded together by cold welding the particles.

5. A method of electrocatalytic hydrogenation of a reactant, comprising:
   contacting a particulate micro-galvanic couple with at least one conductive aqueous solution to form hydrogen,
   electrocatalyzing the reactant with the particulate micro-galvanic couple and the hydrogen to form a metal compound and a hydrogenated reactant,
   wherein the particulate micro-galvanic couple comprises particles of at least one less active conductor and particles of at least one more active metal conductively and fixedly bonded together; and
   wherein the particles of the at least one less active conductor and the particles of the at least one more active metal retain their natural properties when conductively and fixedly bonded together.

6. The method of claim 5, wherein the micro-galvanic couple comprises from about 0.1 to 20.0 wt. % the less active conductor and from about 99.9 to 80.0 wt. % the more active metal.

7. The method of claim 5, wherein the reactant is selected from the group consisting of alkenes, alkynes, ketones, aldehydes, esters, imines, nitriles, nitro compounds, unsaturated hydrocarbons, unsaturated fats, aromatics, carbohydrates, hydrophilic polymers, cellulose, clay, carbohydrate gelling agent, protein gelling agent and hydrocolloid gum.

8. The method of claim 5, wherein particles of the at least one less active conductor and particles of the at least one or more active metal are conductively and fixedly bonded together by cold welding the particles.

9. The method of claim 5, wherein the conductive aqueous solution comprises water and alkali metal salts or alkaline earth metal salts or a combination thereof.

10. A method of electrocatalytic hydrogenation of a reactant, comprising:
    electrocatalyzing the reactant with a particulate micro-galvanic couple and hydrogen to form a metal compound and a hydrogenated reactant,
    wherein the particulate micro-galvanic couple comprises particles of at least one less active conductor and particles of at least one more active metal conductively and fixedly bonded together;
    wherein the particles of the at least one less active conductor and the particles of the at least one more active metal retain their natural properties when conductively and fixedly bonded together;
    wherein the micro-galvanic couple comprises from about 0.1 to 20.0 wt. % the less active conductor and from about 99.9 to 80.0 wt. % the more active metal; and
    wherein the reactant is selected from the group consisting of alkenes, alkynes, ketones, aldehydes, esters, imines, nitriles, nitro compounds, unsaturated hydrocarbons, unsaturated fats, aromatics, carbohydrates, hydrophilic polymers, cellulose, clay, carbohydrate gelling agent, protein gelling agent and or hydrocolloid gum that can be hydrated in deliquescent substance(s) solutions around room temperature.

11. The method of claim 10, wherein particles of the at least one less active conductor and particles of the at least one or more active metal are conductively and fixedly bonded together by cold welding the particles.

12. The method of claim 1, wherein the reactant is glucose and the hydrogenated reactant is sorbitol.

13. The method of claim 1, wherein the method is used to sequester hydrogen.

14. The method of claim 5, wherein the method is used to sequester hydrogen.

15. The method of claim 10, wherein the method is used to sequester hydrogen.

16. The method of claim 4, wherein a dimension of the particulate micro-galvanic couple is in the range of from about 0.2 mm to 6 mm.

17. The method of claim 8, wherein a dimension of the particulate micro-galvanic couple is in the range of from about 0.2 mm to 6 mm.

18. The method of claim 11, wherein a dimension of the particulate micro-galvanic couple is in the range of from about 0.2 mm to 6 mm.

19. The method of claim 1, wherein the micro-galvanic couple comprises from about 1.0 to 5.0 wt. % less active conductor and from about 99.0 to 95.0 wt. % more active metal.

20. The method of claim 5, wherein the micro-galvanic couple comprises from about 1.0 to 5.0 wt. % less active conductor and from about 99.0 to 95.0 wt. % more active metal.

* * * * *